United States Patent [19]

Vollhardt

[11] Patent Number: 5,458,859
[45] Date of Patent: Oct. 17, 1995

[54] DEVICE FOR REMOVING HEAVY METALS AND SLAGS FROM SYNTHESIS GAS PRODUCED FROM REFINERY WASTES

[75] Inventor: Frohmut Vollhardt, Oberhausen, Germany

[73] Assignee: Man Guthehoffnungshütte, Oberhausen, Germany

[21] Appl. No.: 210,215

[22] Filed: Mar. 18, 1994

[30] Foreign Application Priority Data

Apr. 2, 1993 [DE] Germany ............... 43 10 730.3

[51] Int. Cl.$^6$ .................................................. C10J 3/68
[52] U.S. Cl. .................. 422/241; 48/67; 48/77; 422/194
[58] Field of Search .................. 422/241, 194, 422/177; 165/157, 163; 48/77, 67, 69

[56] References Cited

U.S. PATENT DOCUMENTS

| | | |
|---|---|---|
| 4,289,502 | 9/1981 | Muenger et al. . |
| 4,309,196 | 1/1982 | Vollhardt . |
| 4,318,894 | 3/1982 | Hensel et al. ............ 422/177 X |
| 4,328,008 | 5/1982 | Muenger et al. . |

FOREIGN PATENT DOCUMENTS

| | | |
|---|---|---|
| 175819 | 4/1986 | European Pat. Off. . |
| 2325204 | 12/1974 | Germany . |
| 2556370 | 6/1977 | Germany . |
| 2951153 | 9/1981 | Germany . |
| 1589772 | 5/1981 | United Kingdom . |

*Primary Examiner*—Timothy M. McMahon
*Attorney, Agent, or Firm*—McGlew and Tuttle

[57] ABSTRACT

A device for removing heavy metals and slags from synthesis gas produced from refinery wastes includes a gas deflecting device (3, 4), in which the hot synthesis gas, flowing vertically in the downward direction, is deflected into the horizontal direction and enters a known waste heat cooler (2). The gas deflecting device is arranged under a prior-art synthesis gas reactor (1). A ceramic deflecting wall (5), around the lower end of which the synthesis gas is guided, is built in within the deflecting device (3, 4). Since synthesis gas produced from refinery wastes contains a relatively high percentage of heavy metals and slags, there is a risk that these particles will contaminate the [heat] exchanger walls of the subsequent waste heat cooler (2). The heavy metals and slags are separated frown the gas flow in the deflecting device (3, 4). The heavy metal and slag particles present in the liquid form within the hot gas follow a downward path due to their higher specific gravity compared with that of the gas and enter a water quencher (7) arranged under the deflecting device (3, 4), in which they granulate. The synthesis gas, freed from heavy metals and slags, enters the downstream waste heat cooler (2).

5 Claims, 3 Drawing Sheets

5,458,859

DEVICE FOR REMOVING HEAVY METALS AND SLAGS FROM SYNTHESIS GAS PRODUCED FROM REFINERY WASTES

BACKGROUND OF THE INVENTION

Environmental regulations require tile thermal utilization of refinery wastes. This is done by partial oxidation. The synthesis gas produced in this manner can be used in ammonia, methanol, and oxo plants, or energy can be generated from this gas in gas and steam power plants.

However, the synthesis gas formed during the use of refinery wastes contains a higher percentage of heavy metals, especially nickel and vanadium, than that produced in synthesis gas plants, which use crude oil or natural gas.

If such heavy metals reach the cooling surfaces of the waste heat cooler located downstream of the synthesis gas reactor with the synthesis gas, this circumstance leads to contamination of the heat transfer surfaces in a very short time. The cleaning of tire waste heat cooler, which consequently becomes necessary relatively frequently, leads to shutdowns of the plant.

It has been known that the synthesis gas reactor, which is operated under a high gas pressure and at high temperatures, can be lined with ceramic material. It has also been known (from, e.g., German Auslegeschrift No. DE-AS 25 56 370) that the synthesis gas produced can be guided into the downstream waste heat cooler via a horizontal or ascending junction in the lower part of the reactor. This junction is also lined with ceramic material.

SUMMARY AND OBJECTS OF THE INVENTION

It is a primary object of tire present invention to improve a device discussed in the introduction such that a more reliable operation of the synthesis gas plant will be guaranteed, and the discharge of the heavy metals and slags contained in the synthesis gas into the waste heat cooler will be avoided.

According to the invention, a device for removing heavy metals and slags from synthetic gas produced during partial oxidation from refinery wastes includes a waste heat cooler wherein the synthesis gas leaving a ceramic lined reactor is subsequently cooled. A ceramic lined deflecting device with a deflecting wall made of ceramic material is arranged under the ceramic lined reactor for deflecting the gas flow in the direction of the waste heat cooler. A water quencher is connected under the deflecting device. Liquid heavy metal and slag particles discharged during the deflection of the gas flow drop into the water quencher.

The deflecting device is preferably of a spherical design. The deflecting device may be provided with a circular cross section. A deflecting wall preferably has a coolable, steel support device on an inner side. Inner walls of the water quencher are preferably provided with a feed water preheater coil. The feed water preheater coil is extended up to below the lined outlet of the deflecting device.

A ceramic-lined deflecting device, which is arranged directly under the outlet of the reactor, and in which a deflecting wall is built in, is provided according to the present invention to facilitate the deflection of the synthesis gas flow from the vertical reactor axis to the horizontal direction, in the direction of the waste heat cooler.

Designing the deflecting device as one of a spherical design proved to be particularly advantageous concerning the guidance of tile gas and the maintenance of a uniformly high temperature in tile area of the deflection.

The ceramic deflecting wall may have a steel support frame on the inside, if necessary, i.e., the ceramic lining is built up around this frame in such a design. The steel frame must be provided with liquid or air cooling.

As a consequence of their higher specific gravity compared with that of the gas, the heavy metals and slags contained in the synthesis gas drop downward into a water quencher arranged under the deflecting device prior to the deflection, i.e., between the inner surface of the deflecting device and the ceramic deflecting wall. The particles granulate in this water quencher and are discharged as needed.

The various features of novelty which characterize tile invention are pointed out with particularity in tile claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
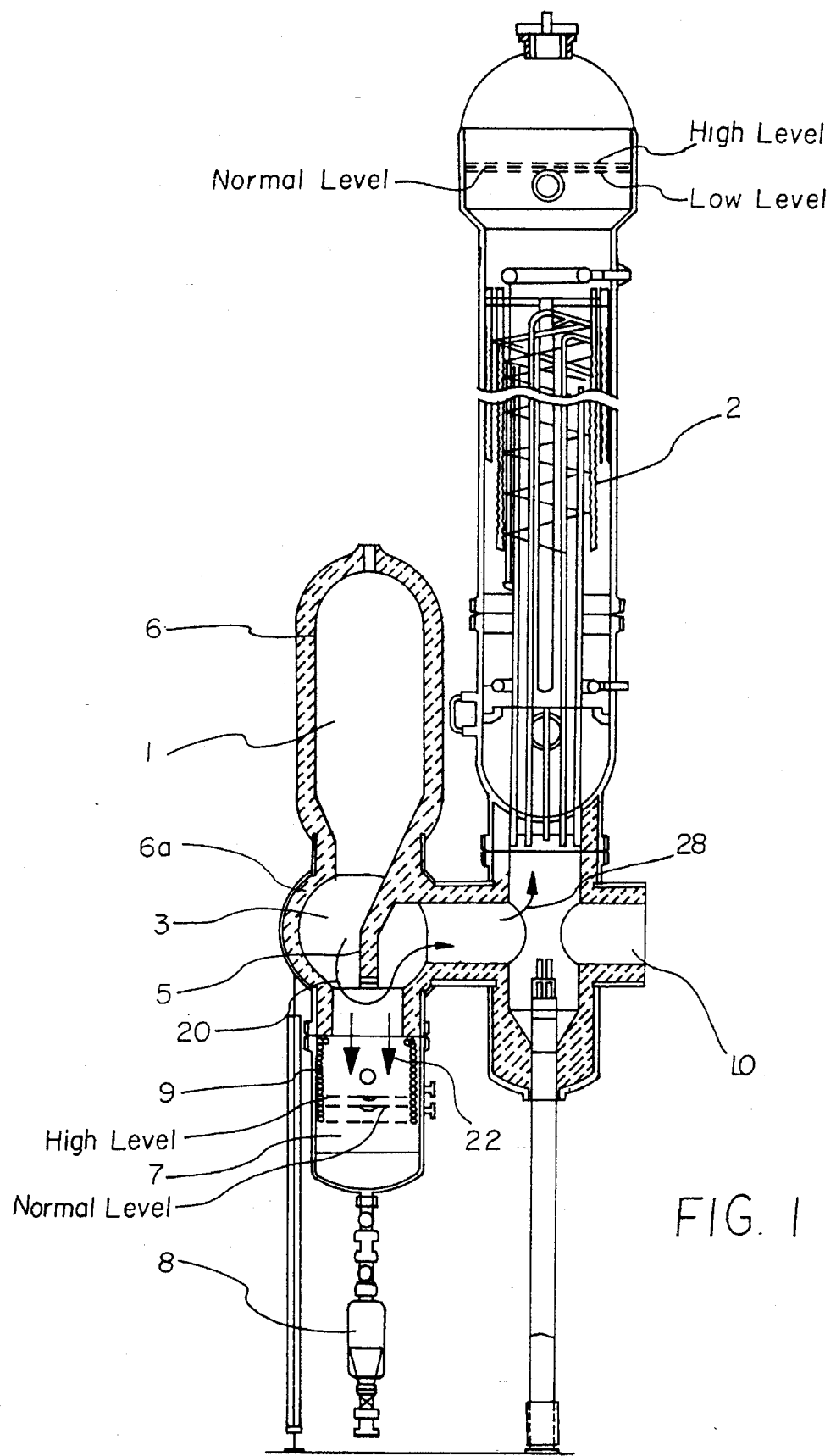
FIG. 1 is a vertical sectional view through the entire device with synthesis gas reactor, spherical deflecting device and waste heat cooler.

Referring to the drawings in particular, synthesis gas is produced in the reactor 1. This reactor 1 is provided with a ceramic lining 6 in the known manner. In this case, the gas is produced from refinery wastes.

The lower outlet of the synthesis gas reactor 1 is joined by a deflecting device 3, which has a spherical shape according to FIG. 1. The inner surface of the deflecting device 3 has a ceramic lining 6a.

A ceramic deflecting wall 5, which is extended from the reactor outlet down to the middle of the spherical deflecting device and then extends vertically, is arranged within the deflecting device 3. The hot synthesis gases flowing in the downward direction are guided upward around the lower edge of the deflecting wall 5, as shown by arrow 20 in the deflecting device 3, after which they enter the waste heat cooler 2 as shown by arrow 28. Due to their higher specific gravity compared with that of the gas, the liquid heavy metal and slag particles, which are present in the synthesis gas as interfering factors, drop, as shown by arrow 22 downward between the inner wall of the deflecting device and the deflecting wall 5 during the deflection of the gas and enter the water quencher 7.

The heat exchanger represented in the figures to the right next to and above the reactor 1 is a waste heat cooler 2 according to the state of the art (such as DE 25 56 370 which is hereby incorporated by reference see also the waste heat boiler of U.S. Pat. No. 4,309,196 which is hereby incorporated by reference).

The vertical walls of the water quencher 7 are lined with an economizer coil (feed water preheater coil 9) at least in their upper area. The economizer coil 9 is used to recover heat, and it prevents the water from evaporating into the superjacent synthesis gas space (the deflecting device 3 and the reactor 1).

As is apparent from FIG. 1, the feed water preheater coil 9 is advantageously extended upward to the extent that it also covers the ceramic-lined area 6a under the outlet of the deflecting device 3.

Shut-off devices and a collection container 8, which is used to collect the granulated heavy metals and slags, are indicated under the water quencher 7.

A gas outlet space 10 is indicated in the lower part of the waste heat cooler 2, opposite the synthesis gas inlet line arriving from the deflecting device 3, 4. If the waste heat cooler is out of operation because of a malfunction or repair, it is consequently possible to guide the entire amount of synthesis gas, which is produced in the reactor 1 and is subsequently purified, through a water quencher (not shown here) and to cool it there.

Figure 2:
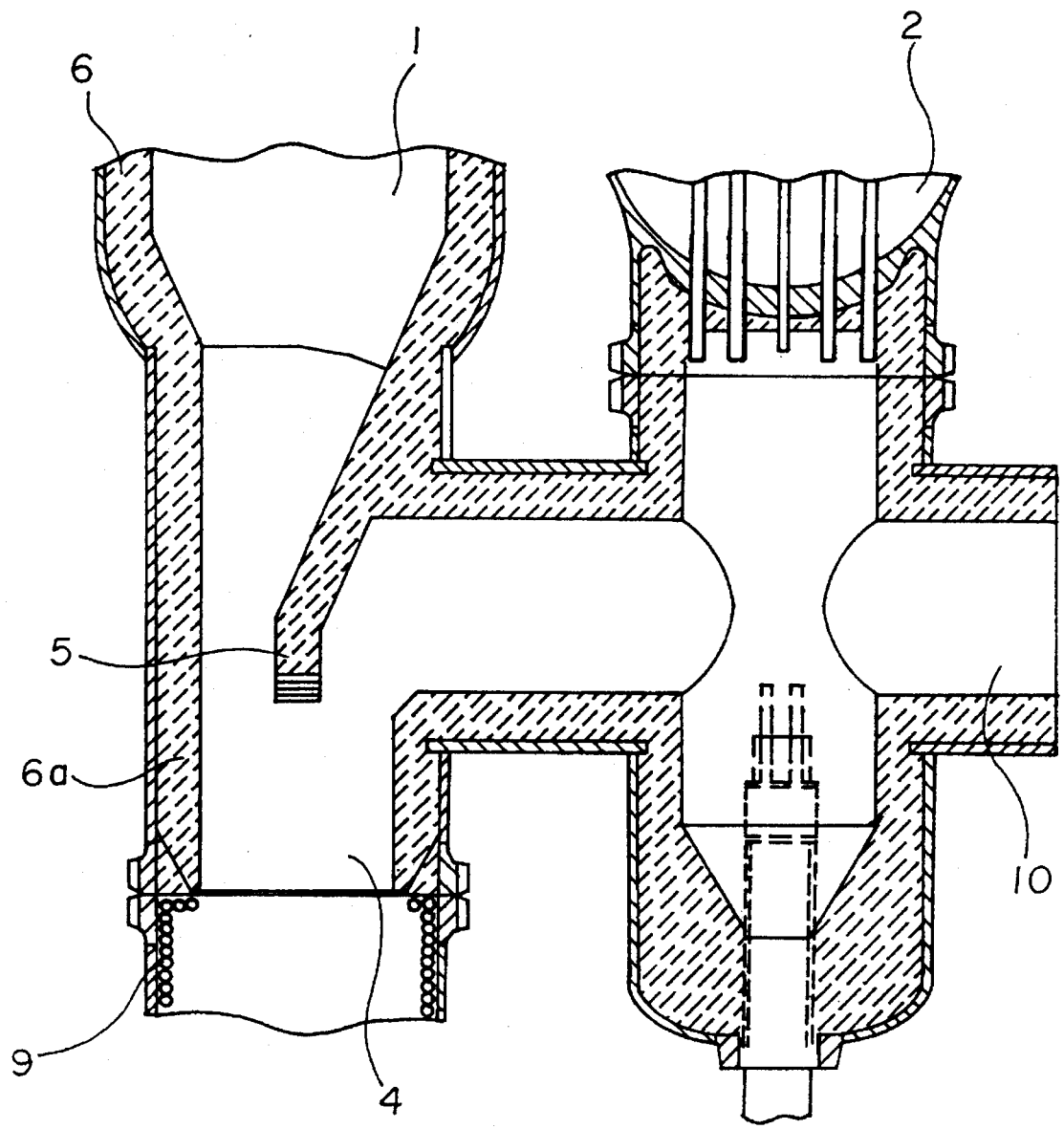
FIG. 2 is a vertical sectional view through an alternative design of the deflecting device on an enlarged scale.

FIG. 2 shows an alternative design of the deflecting device 4. In contrast to the spherical design according to FIG. 1, the vertical and horizontal sections of this deflecting device 4 have circular cross sections. The design of the deflecting device otherwise corresponds essentially to that described above.

Figure 3:
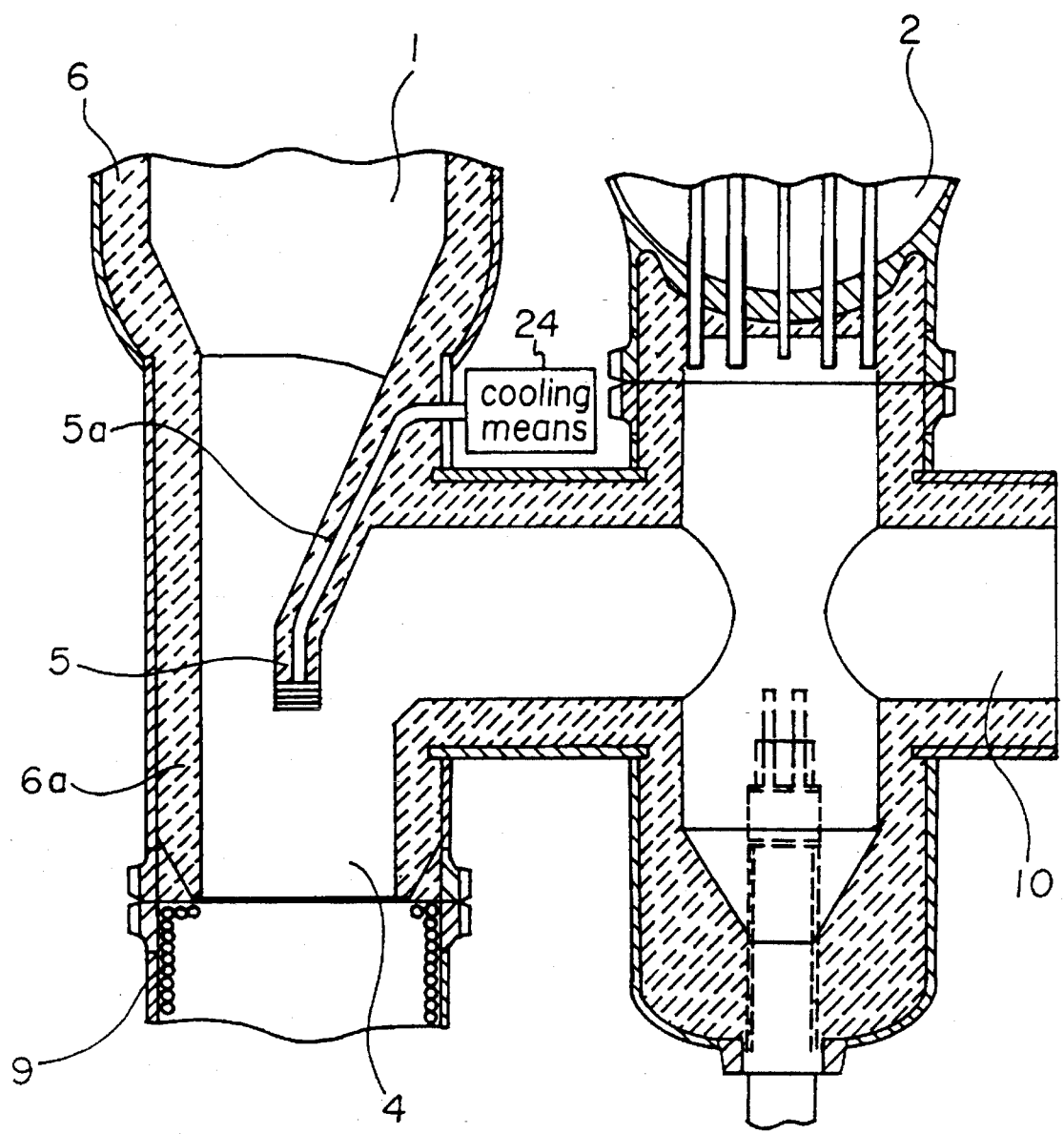
FIG. 3 is a vertical sectional view through the deflecting device of FIG. 2, showing a steel support provided within an interior of a ceramic lining of the deflecting device.

FIG. 3 is a view of the design of FIG. 2 showing the coolable steel support 5a. This support is not shown in FIG. 1 and 2 as the support is lined with refractory ceramic as shown in FIG. 1 and 2. The steel support is preferably provided with cooling means such as liquid or air cooling means 24.

While specific embodiments of the invention have been shown and described in detail to illustrate the application of the principles of the invention, it will be understood that the invention may be embodied otherwise without departing from such principles.

What is claimed is:

1. Apparatus for removing heavy metals and slags from synthesis gas produced during partial oxidation from refinery wastes, comprising:

a ceramic-lined vessel defining a reactor said vessel including a vessel inlet and a vessel outlet;

waste heat cooler means for cooling synthesis gas, said waste heat cooler means having a synthesis gas inlet;

a ceramic-lined deflecting device defining a spherical chamber including a deflecting wall formed of ceramic material said deflecting wall has a steel support device provided in the interior thereof, said ceramic-lined deflecting device being positioned under said vessel and having a deflecting device inlet connected to said vessel outlet, said deflecting device having a synthesis gas outlet connected to said waste heat cooler means, said deflecting wall being positioned between said deflecting device inlet and said synthesis gas outlet for deflecting gas flowing from said vessel to said waste heat cooler means, said deflecting device including a liquid heavy metal and slag particle outlet provided below said deflecting wall; and water quencher means having an inlet connected to said deflecting device at said liquid heavy metal and slag particle outlet for receiving drops of liquid heavy metal and slag particles discharged during the deflection of gas flow and for quench cooling said drops.

2. An apparatus according to claim 1, further comprising cooling means for cooling said steel support device.

3. An apparatus according to claim 1, wherein: said water quencher has inner walls provided with a feed water preheater coil for extracting heat.

4. An apparatus according to claim 3, wherein:

said feed water preheater coil is extended up to below a lined outlet of said deflecting device.

5. Apparatus for removing heavy metals and slags from synthesis gas produced during partial oxidation from refinery wastes, comprising:

a ceramic-lined vessel defining a reactor said vessel including a vessel inlet and a vessel outlet;

waste heat cooler means for cooling synthesis gas, said waste heat cooler means having a synthesis gas inlet;

a ceramic-lined deflecting device including a deflecting wall formed of ceramic material said deflecting wall having a steel support device provided in the interior thereof, said ceramic-lined deflecting device being positioned under said vessel and having a deflecting device inlet connected to said vessel outlet, said deflecting device having a synthesis gas outlet connected to said waste heat cooler means, said deflecting wall being positioned between said deflecting device inlet and said synthesis gas outlet for deflecting gas flowing from said vessel to said waste heat cooler means, said deflecting device including a liquid heavy metal and slag particle outlet provided below said deflecting wall; and water quencher means having an inlet connected to said deflecting device at said liquid heavy metal and slag particle outlet for receiving drops of liquid heavy metal and slag particles discharged during the deflection of gas flow and for quench cooling said drops.

* * * * *

UNITED STATES PATENT AND TRADEMARK OFFICE
CERTIFICATE OF CORRECTION

PATENT NO. : 5,458,859

DATED : October 17, 1995

INVENTOR(S) : Frohmut VOLLHARDT

It is certified that error appears in the above-identified patent and that said Letters Patent is hereby corrected as shown below:

On the title page, item

[73] Assignee: MAN Gutehoffnungshütte, Oberhausen, Germany

Signed and Sealed this

Ninth Day of January, 1996

BRUCE LEHMAN

*Attest:*

*Attesting Officer*   *Commissioner of Patents and Trademarks*